Dec. 2, 1941. G. W. BEALS 2,265,021
DIRECT LIGHTING LUMINAIRE
Filed Sept. 23, 1939 3 Sheets-Sheet 1
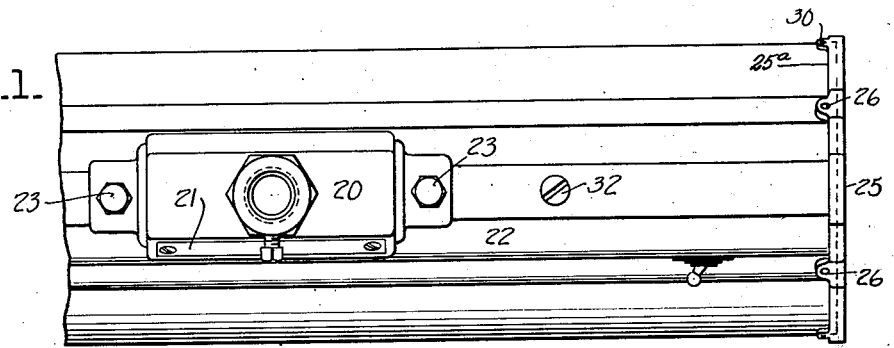
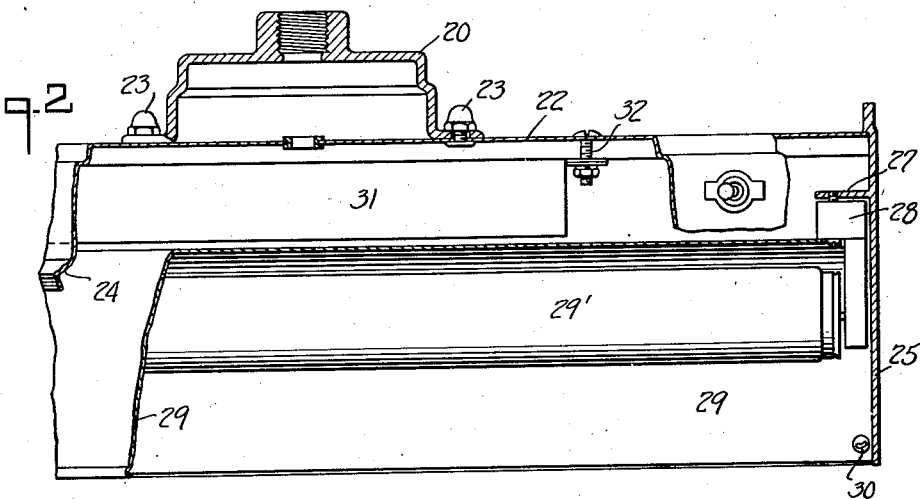
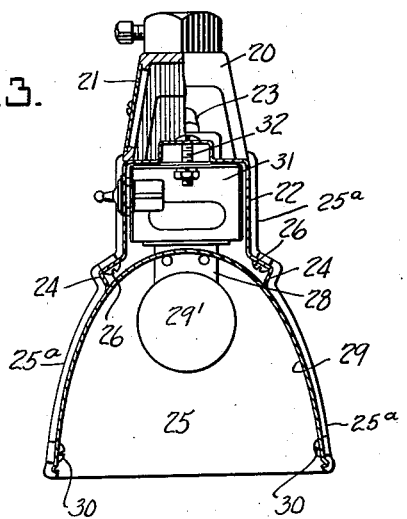
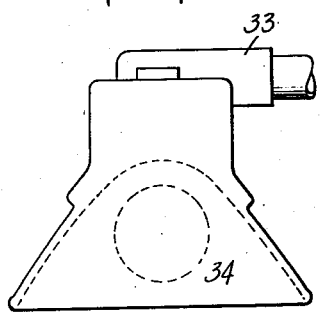
INVENTOR
GILLSON W. BEALS
BY
ATTORNEY

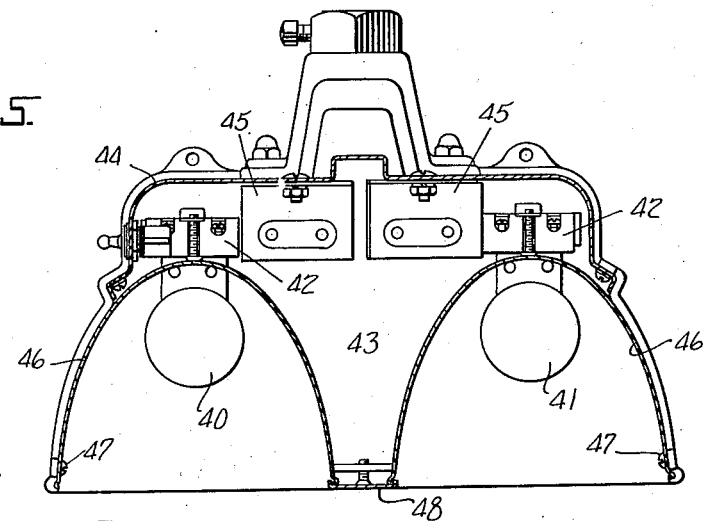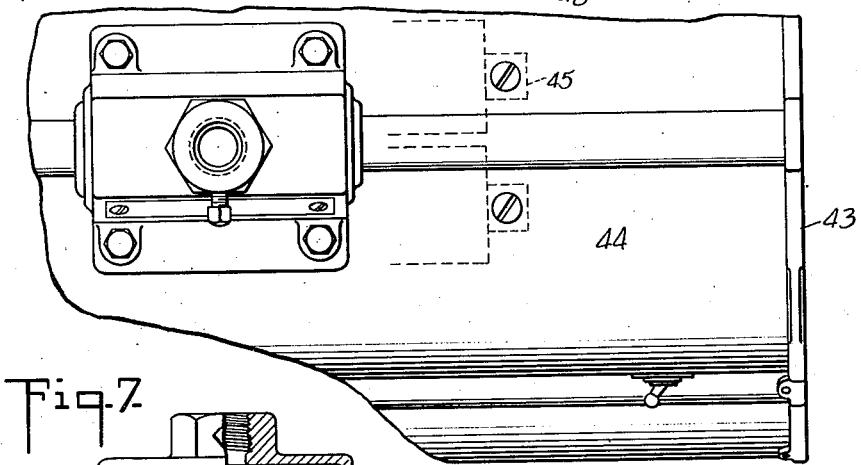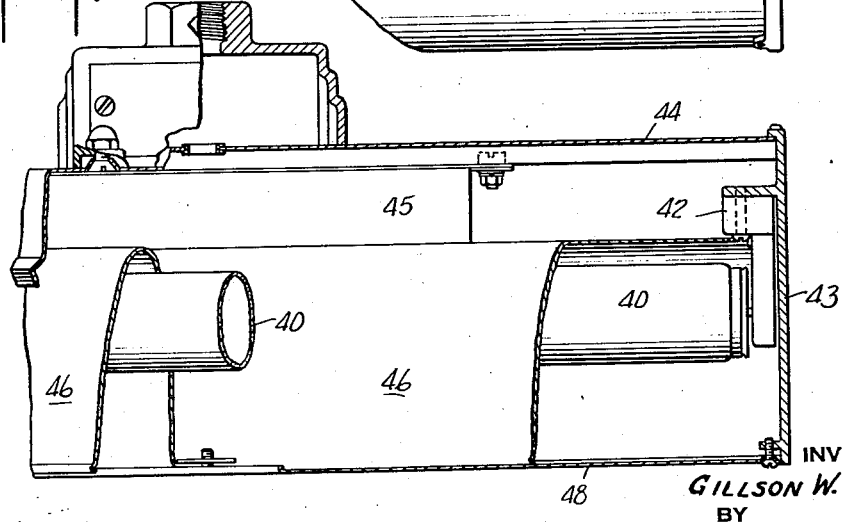

Dec. 2, 1941.　　　G. W. BEALS　　　2,265,021
DIRECT LIGHTING LUMINAIRE
Filed Sept. 23, 1939　　　3 Sheets-Sheet 3
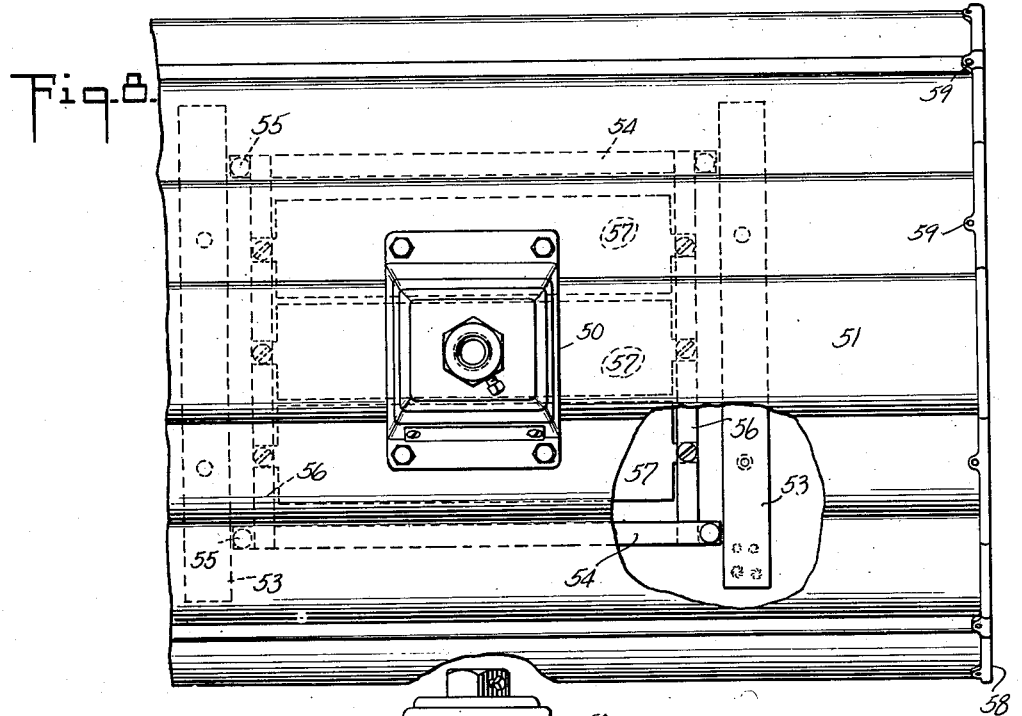
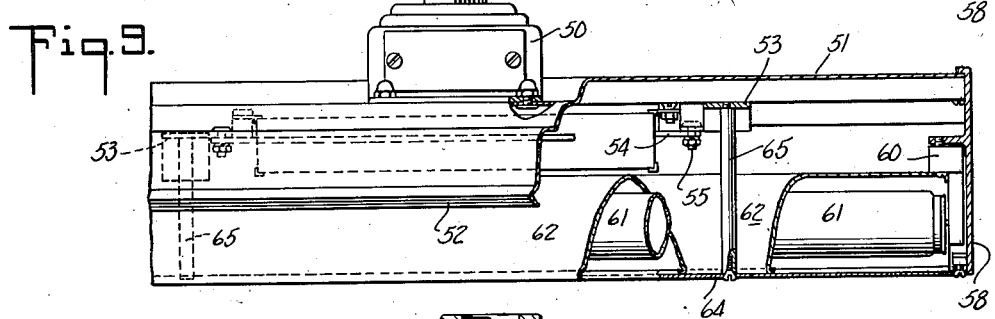
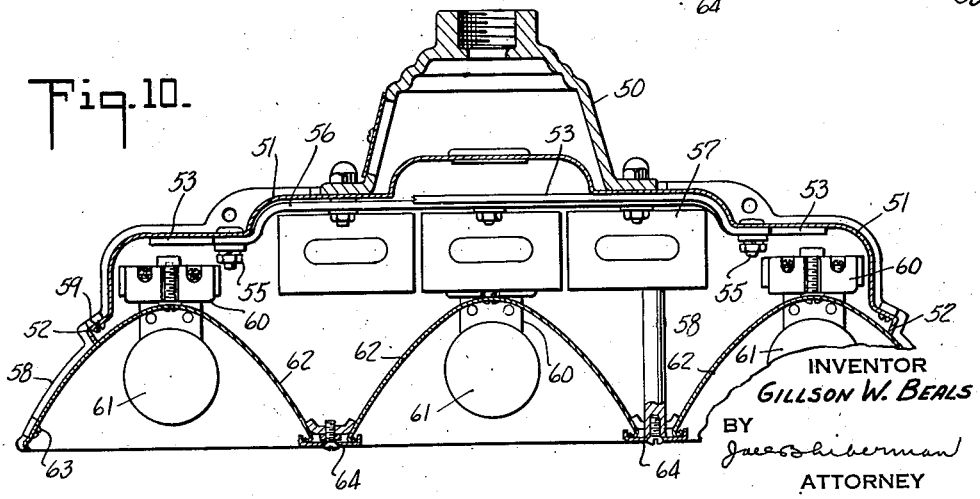
INVENTOR
GILLSON W. BEALS
BY
Jacob Liberman
ATTORNEY Patented Dec. 2, 1941

2,265,021

UNITED STATES PATENT OFFICE 2,265,021

DIRECT LIGHTING LUMINAIRE

Gillson W. Beals, Meriden, Conn., assignor to The Miller Company, Meriden, Conn., a corporation of Connecticut Application September 23, 1939, Serial No. 296,193

5 Claims. (Cl. 240—78)

The present invention relates to direct lighting luminaires, and is more particularly directed toward luminaires adapted to employ fluorescent lighting lamps.

The present invention contemplates luminaires employing one or more fluorescent lamps and wherein each lamp is associated with an inverted trough like reflector to distribute the light downwardly, the reflector or reflectors being secured to end plates which in turn are secured to channel members adapted to stiffen the structure, accommodate the auxiliary units necessary with fluorescent lamps and the wiring between the units and lamp-holders. The reflector element can be made out of sheet metal of high reflecting properties formed to shape to give the desired distribution, while the channel member may be formed of sheet metal of suitable structural strength to afford the desired rigidity to the fixture. The end plates may be made in the form of castings adapted for ready securement to the channels and reflectors.

The accompanying drawings show, for purposes of illustrating the present invention, several embodiments in which the invention may take form, it being understood that the drawings are illustrative of the invention rather than limiting the same.

In these drawings:

Figure 1 is a top plan view of a direct lighting luminaire adapted to use one fluorescent tube;

Figure 2 is a longitudinal sectional view through the same with parts in elevation;

Figure 3 is a transverse sectional view with parts in elevation;

Figure 4 is an end view of modified form of unit adapted for using a single fluorescent tube;

Figure 5 is a cross sectional view through a unit adapted to use two fluorescent tubes;

Figure 6 is a fragmentary top plan view of the same;

Figure 7 is a fragmentary longitudinal sectional view of the same with parts in elevation;

Figure 8 is a top plan view of a unit adapted to use three fluorescent tubes with parts broken away to show interior construction;

Figure 9 is a side elevational view of the same with parts in section; and

Figure 10 is a transverse sectional view with parts in elevation.

In the form of construction illustrated in Figures 1, 2 and 3 the luminaire is adapted to be supported by a junction box 20 secured to a pipe or other support. The junction box has a removable plate 21 to permit access to the wires. The junction box 20 is secured to a channel-shaped member 22 by bolts indicated at 23. The lower edges of the channel 22 are provided with stiffening beads, as indicated at 24, and are secured to end plates 25 by means of screws indicated at 26. The end plates have inwardly extending lugs 27 adapted to support lamp sockets or holders 28 of the type employed in supporting fluorescent tubes. The end plates extend below the channel edges and are widened as indicated in the drawings. An inverted sheet metal reflecting trough 29 of contour to provide intensive distribution from the fluorescent lamp 29' is secured between the end plates by screws indicated at 30. The ends of the channel and of the trough fit inside of flanges 25a at the edges of the end plates. The beads 24 of the channel come close to the reflecting trough so as to hold the thin sheet metal in alignment and to provide a tight chamber for the fluorescent lamp auxiliary unit indicated at 31 and wiring (not shown) leading from the unit to the lamp-holders. The unit 31 is secured in place by bolts 32.

The luminaire shown in Figure 4 is more particularly adapted for use in portable lamps or brackets. Instead of using a channel supporting conduit in the form of the junction box 20 of Figures 1 to 3, the luminaire of Figure 4 uses an arm 33 which can be secured to the top of the channel in any suitable manner, this arm carrying the wiring. The contour of the end plate 34 of the structure of Figure 4 differs somewhat from that of the end plate 25 of Figure 3 indicating the change in shape of the reflector which would be employed for an extensive distribution of light.

In the arrangement shown in Figures 5 to 7 the fluorescent tubes 40 and 41 are secured to lamp-holders 42 arranged in pairs and secured to end plates 43. The end plates are secured to a channel member 44 similar to the channel member above referred to, but made wider so as to accommodate two auxiliary units 45 and fit about two reflectors 46. One of the free edges of each of the reflectors is secured to the end plates, as indicated at 47, while the other edges are clamped to a closure strip 48.

In the arrangement shown in Figures 8, 9 and 10 the junction box 50 is secured to a wide channel shaped member 51 having downwardly extending edges 52 similar to the beads 24 shown in Figure 3. Owing to the width of the channel member it is preferable to reinforce it by cross strips 53 welded to it. The channel member supports two parallel longitudinally extending straps 54 secured in place by bolts, indicated at 55. These straps support cross straps 56 which in turn support three fluorescent lamp auxiliaries indicated at 57. The channel member 51 is secured to end plates 58 by screws indicated at 59. The end plates support three pairs of lampholders 60 which are adapted to support three fluorescent tubes indicated at 61. These tubes are received in reflectors 62 here shown of contour to provide extensive distribution. The outer edges of the two reflectors are secured to the end plates 58 by screws 63. The inner edges of the outer reflectors are secured to the intermediate reflector by closure strips indicated at 64. Where a long unit is employed these strips may be supported by tie rods 65 carried by the cross straps 53.

Fluorescent units made according to the present invention may be readily constructed in various sizes to accommodate the various lengths of fluorescent lamp available, it merely being necessary to make the channel members and reflectors longer and provide for appropriate mounting for the auxiliary units depending upon their length. Where the units are fastened directly to the channels, as in Figures 1 to 7, it is merely necessary to punch holes at the proper place for securing the auxiliary units in place. In the arrangement of Figure 8 the straps 54 are long enough to accommodate the longest units to be used and shorter units can readily be mounted by merely securing them to the straps 56 and securing the straps 56 in place behind the straps 54.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. In a fluorescent direct lighting luminaire, a downwardly opening channel of stiff sheet metal, a channel supporting conduit, a plurality of fluorescent lamp auxiliaries secured within the channel, end plates secured to the channel, the end plates having lugs intermediate the top and bottom of the channel and extending downwardly below the channel, pairs of lamp sockets secured to the lugs and extending below the edges of the channel, a fluorescent lamp received by each pair of lamp sockets, and downwardly acting, open mouthed, sheet metal reflecting troughs secured to the end plates and about the respective lamps, the edges of the channel terminating adjacent the outside walls of the outer reflecting troughs so that the troughs are kept aligned thereby, the side edges of the end plates below the said edges of the channel having flanges conforming to the contour of the reflecting troughs and engaging the ends thereof.

2. In a fluorescent direct lighting luminaire, a downwardly opening channel of stiff sheet metal, a channel supporting conduit, a frame secured in the channel, a plurality of fluorescent lamp auxiliaries secured to the frame, end plates secured to the channel, the end plates having lugs intermediate the top and bottom of the channel and extending downwardly below the channel, pairs of lamp sockets secured to the lugs and extending below the edges of the channel, a fluorescent lamp received by each pair of lamp sockets, and downwardly acting, open mouthed, sheet metal reflecting troughs secured to the end plates and about the respective lamps, the edges of the channel terminating adjacent the outside walls of the outer reflecting troughs so that the troughs are kept aligned thereby, the side edges of the end plates below the said edge of the channel having flanges conforming to the contour of the reflecting troughs and engaging the ends thereof.

3. A direct lighting luminaire comprising a horizontal downwardly opening channel of stiff sheet metal, vertical, substantially flat end plates secured to the ends of the channel and held thereby in fixed position, the end plates extending below the channel and diverging laterally from the lower edges thereof to form end walls wider below the channel than above it and having inwardly extending flanges below the channel, and a plurality of parallel, inverted reflecting troughs whose ends are secured to the end plates adjacent the lower edges thereof, the outer troughs each having their ends within the flanges and a downwardly and outwardly extending wall close to a lower edge of the channel to be kept aligned thereby, and fluorescent lamp sockets carried by each end plate in a position to support a fluorescent lamp within each reflecting trough.

4. A direct lighting luminaire comprising a horizontal downwardly opening channel of stiff sheet metal, vertical, substantially flat end plates secured to the ends of the channel and held thereby in fixed position, the end plates extending below the channel and diverging laterally from the lower edges thereof to form end walls wider below the channel than above it and having inwardly extending flanges below the channel, three parallel, inverted reflecting troughs whose ends are secured within the flanges of the end plates adjacent the lower edges thereof, the outer troughs each having a downwardly and outwardly extending wall close to a lower edge of the channel to be kept aligned thereby, fluorescent lamp sockets carried by each end plate in a position to support a fluorescent lamp within each reflecting trough, reinforcing straps bridging the channel, and fluorescent lamp auxiliaries secured within the channel above the reflecting troughs.

5. In a fluorescent direct lighting luminaire, a downwardly opening channel of stiff sheet metal having inwardly bent flanges along its lower edges, a channel supporting conduit, a fluorescent lamp auxiliary secured within the channel, end plates secured to the ends of the channel to close the same, the end plates each having lugs intermediate the top and bottom of the channel and each extending downwardly below the channel at a greater width than the channel, lamp sockets secured to the lugs and extending below the edges of the channel, a fluorescent lamp received by the lamp sockets, and a downwardly acting, open mouthed, sheet metal reflecting trough secured to the end plates, said flanges of the channel terminating adjacent the outside walls of the reflecting trough so that the said trough is kept aligned thereby, the edges of the end plates having flanges conforming to the contour of the channel and of the walls of the reflecting trough below the channel and engaging the ends of the channel and trough.

GILLSON W. BEALS.